US010990334B2

(12) United States Patent
Kaneda et al.

(10) Patent No.: US 10,990,334 B2
(45) Date of Patent: Apr. 27, 2021

(54) SYSTEM, SERVER AND METHOD OF CONTROLLING THE SYSTEM AND METHOD OF CONTROLLING THE SERVER

(71) Applicant: CANON KABUSHIKI KAISHA, Tokyo (JP)

(72) Inventors: Takeshi Kaneda, Funabashi (JP); Masaki Kashiwagi, Hiratsuka (JP); Akinori Takeo, Yokohama (JP); Jun Miyajima, Toride (JP); Seijiro Imai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/552,523

(22) Filed: Aug. 27, 2019

(65) Prior Publication Data

US 2020/0073603 A1    Mar. 5, 2020

(30) Foreign Application Priority Data

Aug. 30, 2018    (JP) .............................. JP2018-162104

(51) Int. Cl.
*G06F 3/12* (2006.01)
(52) U.S. Cl.
CPC .......... *G06F 3/1232* (2013.01); *G06F 3/1203* (2013.01); *G06F 3/1253* (2013.01); *G06F 3/1273* (2013.01)
(58) Field of Classification Search
CPC .... G06F 3/1232; G06F 3/1203; G06F 3/1253; G06F 3/1273

USPC ...................................................... 358/1.15
See application file for complete search history.

(56) References Cited

U.S. PATENT DOCUMENTS

| 10,019,661 | B2 | 7/2018 | Kaneda | |
|---|---|---|---|---|
| 10,489,695 | B2 | 11/2019 | Kaneda | |
| 2010/0321716 | A1 | 12/2010 | Takeo | |
| 2012/0081740 | A1* | 4/2012 | Takagi | G06F 3/1267 358/1.15 |
| 2012/0140272 | A1* | 6/2012 | Funane | G06F 3/1208 358/1.15 |
| 2013/0063776 | A1* | 3/2013 | Kishida | G06F 3/1288 358/1.15 |
| 2014/0240727 | A1* | 8/2014 | Imai | H04N 1/00 358/1.9 |

(Continued)

FOREIGN PATENT DOCUMENTS

JP    2006-259853 A    9/2006

*Primary Examiner* — Allen H Nguyen
(74) *Attorney, Agent, or Firm* — Venable LLP

(57) ABSTRACT

A system is operable to save a print job received from an information processing apparatus and transmit the print job to one printing device among a plurality of printing devices that are registered in advance, in response to a request from the one printing device. The system includes a server, that generates capability information for the plurality of printing devices based on capability information indicating a capability of each printing device of the plurality of printing devices, and updates the generated capability information in a case that the capability information indicating the capability of one of the plurality of printing devices changes. The information processing apparatus generates and displays a print setting screen based on the updated capability information obtained from the server.

10 Claims, 12 Drawing Sheets

(56) References Cited

U.S. PATENT DOCUMENTS

| | | | |
|---|---|---|---|
| 2014/0300927 A1* | 10/2014 | Kuroda | H04N 1/00244 |
| | | | 358/1.15 |
| 2017/0060488 A1* | 3/2017 | Oya | G06F 3/1224 |
| 2018/0174004 A1 | 6/2018 | Kaneda | |
| 2018/0239563 A1* | 8/2018 | Okuda | G06F 3/1203 |
| 2019/0286391 A1 | 9/2019 | Totsuka et al. | |
| 2019/0303054 A1 | 10/2019 | Kaneda | |

* cited by examiner

FIG. 13

```
Internet Printing Protocol                                          ~1301
    version: 2.0
    operation-id: Get-Printer-Attributes (0x000b)
    request-id: 1
    operation-attributes-tag
        attributes-charset (charset): 'utf-8'
            name: attributes-charset
            charset value: 'utf-8'
        attributes-natural-language (naturalLanguage): 'en-us'
            name: attributes-natural-language
            naturalLanguage value: 'en-us'
        printer-uri (uri): 'ipp://GanonXXXX.local.:631/ipp/print'
            name: printer-uri
            uri value: 'ipp://GanonXXXX.local.:631/ipp/print'
    event-notification-tag
        event-notification-supported (boolean): 'false'          ~1302
            name: event-notification-supported
            boolean value: 'false'
```

```
Internet Printing Protocol                                          ~1303
    version: 2.0
    status-code: Successful (successful-ok)
    request-id: 1
    operation-attributes-tag
        attributes-charset (charset): 'utf-8'
            name: attributes-charset
            charset value: 'utf-8'
        attributes-natural-language (naturalLanguage): 'ja-jp'
            name: attributes-natural-language
            naturalLanguage value: 'ja-jp'
    attributes-save-tag
        attributes-save-prohibited (boolean): 'true'             ~1304
            name: attributes-save-prohibited
            boolean value: 'true'
    printer-attributes-tag
        printer-more-info (uri): 'http://GanonXXXX.local:8000/rps/airprint'
            name: printer-more-info
            uri value: 'http://GanonXXXX.local:8000/rps/airprint'
```

SYSTEM, SERVER AND METHOD OF CONTROLLING THE SYSTEM AND METHOD OF CONTROLLING THE SERVER

BACKGROUND OF THE INVENTION

Field of the Invention

The present invention relates to a system, a server and a method of controlling the system and a method of controlling the server.

Description of the Related Art

Recent information processing apparatuses can generate print data that can be printed by a printing device without involving a vendor-specific printer driver (or print application) designed for the printing device. For example, print applications and cloud print services in recent years use an IPP-Client module which is standardly incorporated in an OS (operating system), to generate print data based on an IPP specification (IPP: Internet Printing Protocol), and transmit the generated print data to a printing device.

In a cloud printing service based on IPP-Infra specifications, when an information processing apparatus transmits a print job to the cloud printing service, the cloud printing service holds the print job in the cloud. Then, a printing device requests the cloud printing service for the print job, and obtains the print job held in the cloud printing service to execute printing.

As connection modes between the cloud printing service and the printing device, there is a method of linking one printing device for each cloud printing service, and a method of linking a plurality of printing devices to one cloud printing service in aggregation (printing device aggregation). Here, the latter will be described. Capability information obtained by an information processing apparatus from a cloud printing service is configured by a logical OR or a logical AND of capability information obtained by the cloud printing service from printing devices that each have different specifications. The information processing apparatus displays a print screen based on the capability information of a virtual printer obtained from the cloud print service, and the user performs print settings on the screen and transmits a print job. Thereafter, a printing device obtains the print job which was held in the cloud and executes printing.

With a cloud printing service based on an IPP-Infra specification, after an information processing apparatus creates a print job, there is no guarantee, with respect to a printing device or a virtual printer, as to whether capability information obtained from a virtual printer will be saved or whether it will be discarded without being saved each time a print job is created. The behavior after an information processing apparatus has created a print job depends on the implementation of the information processing apparatus. In a case where the information processing apparatus saves capability information of a virtual printer, it is possible to create a print job based on the capability information of the saved virtual printer without obtaining capability information from the virtual printer when creating a print job for the same virtual printer.

Further, in a cloud printing service in which one printing device is linked to a respective cloud printing service, since the virtual printer and the printing device are one-to-one, the capability information of the virtual printer and that of the information processing apparatus always match with each other. In contrast, in a printing device aggregation type cloud printing service, a plurality of printing devices are linked to one virtual printer. Therefore, when the capability information of a printing device constituting a virtual printer changes, the capability information of the virtual printer also changes. Examples of changes in the capability information of a printing device include a reduction in usable functions associated with shifting to a degeneracy mode, an addition or deletion of printing devices constituting the virtual printer, and the like.

With the printing device aggregation type cloud printing service, in a case where an information processing apparatus saves capability information of the virtual printer, when the capability information of the virtual printer changes, a difference will occur between the virtual printer capability information saved by the information processing apparatus and the capability information of the actual virtual printer. As a result, there is a possibility that the information processing apparatus will generate a print job that cannot be executed by a specific printing device.

In Japanese Patent Laid-Open No. 2006-259853, when capability information of a virtual printer is created or updated, an information processing apparatus obtains capability information from each printing device linked to the virtual printer, and creates capability information for the virtual printer. However, when a processing load on the information processing apparatus is large and time required for the processing exceeds a predetermined time, there is a problem that the creation of the capability information will be interrupted. Therefore, in some cases, there is a possibility that capability information of a virtual printer is not successfully created or updated.

SUMMARY OF THE INVENTION

An aspect of the present invention is to eliminate the above-mentioned problem with conventional technology.

A feature of the present invention is to provide a technique that enables an information processing apparatus to create a print job based on latest capability information even if capability information of a printing device dynamically changes.

According to a first aspect of the present invention, there is provided a system operable to save a print job received from an information processing apparatus and transmit the print job to one printing device among a plurality of printing devices that are registered in advance, in response to a request from the one printing device, wherein the system comprises a server, wherein the server includes a controller including a processor and a memory device, and the controller is configured to: generate capability information for the plurality of printing devices based on capability information indicating a capability of each printing device of the plurality of printing devices; and in a case that the capability information indicating the capability of one of the plurality of printing devices changes, update the generated capability information, wherein a print setting screen is generated based on the updated capability information.

According to a second aspect of the present invention, there is provided a method of controlling a system operable to save a print job received from an information processing apparatus and transmit the print job to one printing device among a plurality of printing devices that are registered in advance, in response to a request from the one printing device, the method comprising: generating capability information for the plurality of printing devices based on capability information indicating a capability of each printing device of the plurality of printing devices; and in a case that the capability information indicating the capability of one of the plurality of printing devices changes, updating the generated capability information, wherein a print setting screen to be displayed on the information processing apparatus is generated based on the updated capability information.

According to a third aspect of the present invention, there is provided a server included in a cloud service that is operable to, via a network, provide to an information processing apparatus a print service that aggregates a plurality of printing devices, the server comprising: a controller including a processor and a memory device, and the controller is configured to: in response to a request from the information processing apparatus, notify the information processing apparatus of capability information indicating a capability of the plurality of printing devices; based on information included in the request, register the information processing apparatus as an information processing apparatus that is to be updated; receive a print job and save the print job in a memory; in accordance with change of the capability in any of the plurality of printing devices, update the capability information; perform a notification of the updated capability information to the registered information processing apparatus to be updated; and in a case that the print job saved in the memory is requested from any of the plurality of printing devices, transmit the print job to the requesting printing device, and cause the requesting printing device to print the print job.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 depicts a view illustrating an example of a message for IPP communication between the information processing apparatus and the virtual printer according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
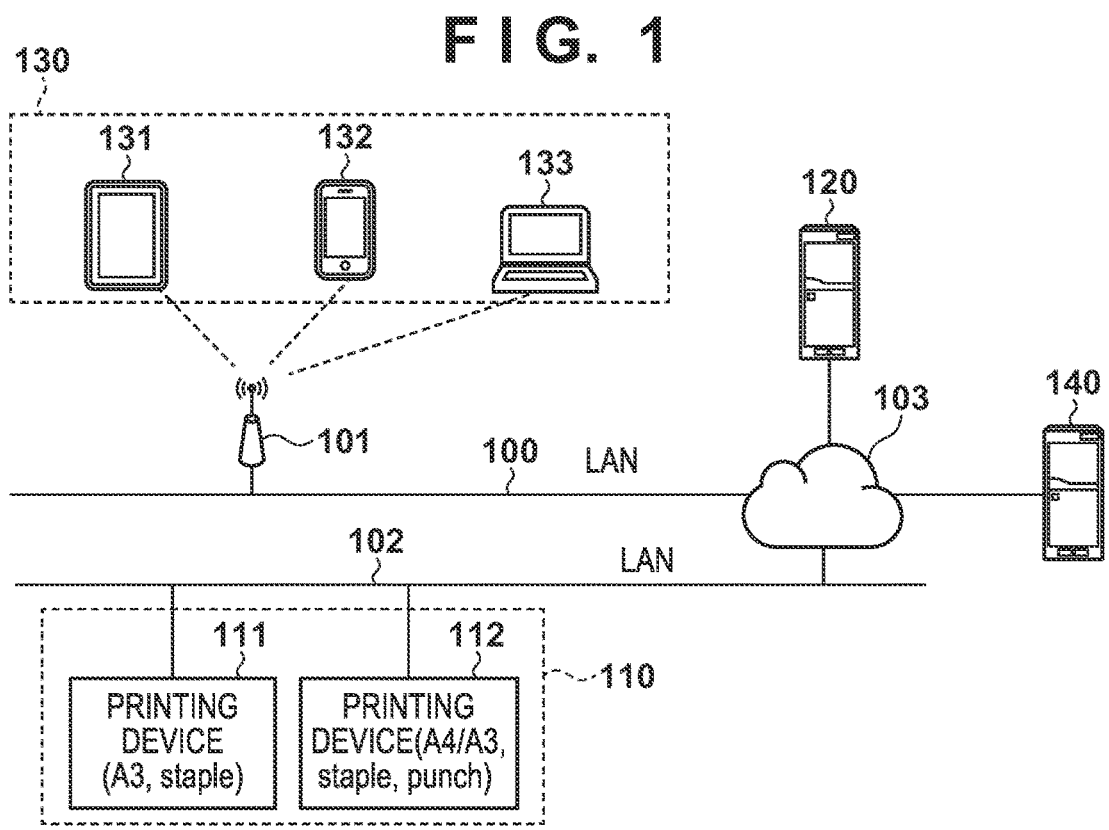
FIG. 1 depicts a view for describing a configuration of a print system according to an embodiment of the present invention.

FIG. 1 depicts a view for describing a configuration of a print system according to the embodiment of the present invention.

An access point (AP) 101 is connected to a LAN (Local Area Network) 100, and a printing device 110 is connected to a LAN 102. In the embodiment, description is given by taking portable terminals 131, 132, and 133—which are tablets, smart phones, PCs, or the like—as examples of an information processing apparatus 130. Note that, in the following description, a tablet 131, a smartphone 132, a PC 133, and the like are collectively referred to as an information processing apparatus 130. The information processing apparatus 130 can, via the AP 101, communicate with a cloud server (hereinafter referred to as a virtual printer) 120 that provides a cloud service and an event delivery server 140 that provides an event delivery service, on the Internet 103. The virtual printer 120 holds a print job transmitted from the information processing apparatus 130. Then, when a print job is requested from any one of the plurality of printing devices managed in aggregation by the virtual printer 120, the virtual printer 120 transmits the held print job to the printing device and causes the printing device to print the print job. The LAN 100 and the LAN 102 may be wireless LANs.

The printing device 110 can communicate with the virtual printer 120 on the Internet 103. In the embodiment, since printing device aggregation in which a plurality of printing devices are aggregated and linked to one cloud printing service is presumed, it is assumed that the printing device 110 includes a printing device 111 that accommodates A3-sized sheets for example and is capable of printing and stapling, and a printing device 112 that accommodates A4-sized and A3-sized sheets and is capable of printing, stapling, and punching. However, in the following description, these printing devices 111 and 112 will be collectively described as the printing device 110. The printing device 110 obtains a print job held in the virtual printer 120 and executes printing.

The event delivery server 140 monitors the state of the virtual printer 120 and, when the capability information of the virtual printer 120 is updated, notifies the information processing apparatus 130 through the Internet 103 that the capability information of the virtual printer 120 has been updated. Here, it is assumed that the capability information of the virtual printer 120 corresponds to the capability information of the printing device 110, and for example, the capability information of the printing device 110 is generated based on a logical AND of the capability information of the printing device 111 and the printing device 112. For example, in the example of FIG. 1, the capability information of the printing device 110 includes a printing function for A3-sized sheets and a stapling function. Further, when the capability information of the virtual printer 120 is updated, the event delivery server 140 transmits to the printing device 110 a notification indicating that the capability information of the virtual printer 120 has been updated.

Note that, while the embodiment exemplifies a case where the virtual printer 120 and the event delivery server 140 are implemented as cloud servers as an example, the present invention is not limited thereto. The virtual printer 120 and the event delivery server 140 may be physical server apparatuses on a network.

In the embodiment, an example of the above-described configuration is described as an example of a print system, but the present invention is not limited to this, and a print system may be at least one information processing apparatus, a printing device, and a virtual printer that are communicably connected via a network. The network may be wireless or wired.

Next, the information processing apparatus 130 will be described. The information processing apparatus 130 creates a print job based on a user setting, and transmits the print job to the virtual printer 120.

Figure 2:
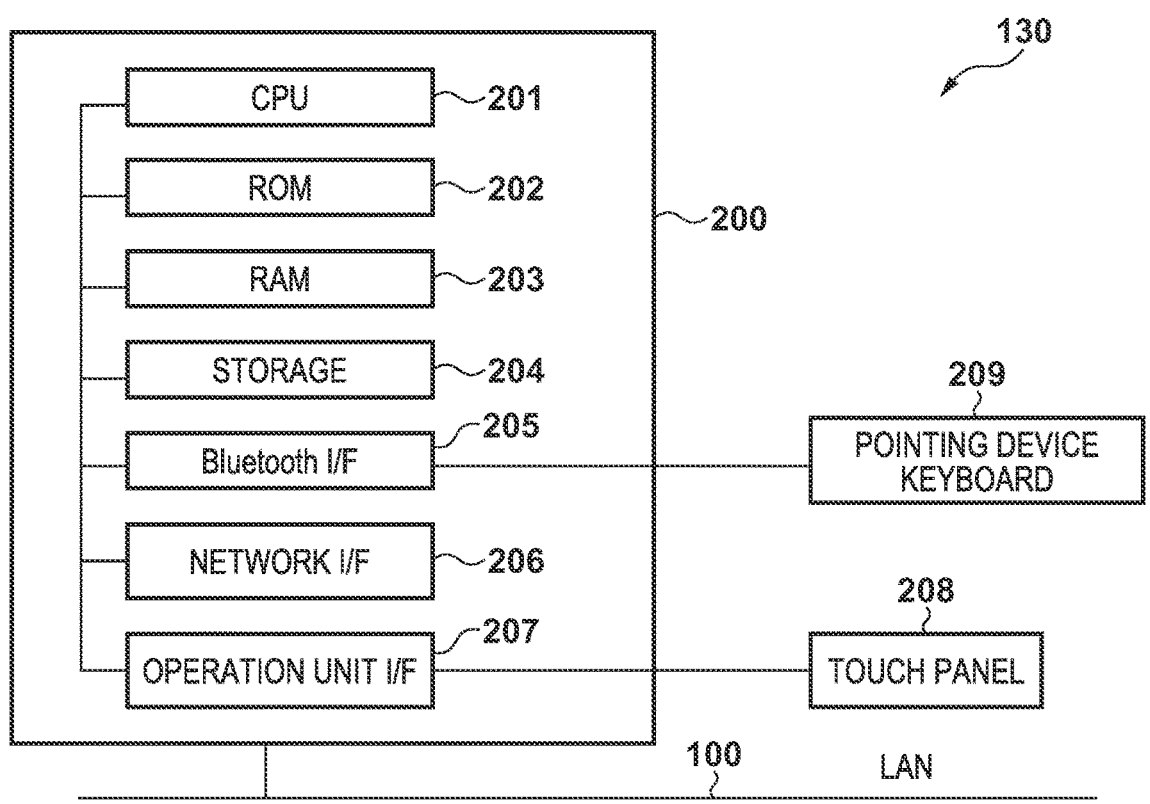
FIG. 2 is a block diagram for describing a hardware configuration of an information processing apparatus according to the embodiment.

FIG. 2 is a block diagram for describing a hardware configuration of the information processing apparatus 130 according to the embodiment.

A control unit 200 which includes a CPU (Central Processing Unit) 201 controls operation of the entirety of the information processing apparatus 130. The CPU 201 deploys a program stored in a ROM (Read Only Memory) 202 or a storage 204 to a RAM 203, and executes the deployed program to perform various processing. The ROM 202 stores a control program, a boot program, and the like which can be executed by the CPU 201. The RAM (Random Access Memory) 203 is a main memory of the CPU 201, and is used as a work area or a temporary storage area for deploying various control programs. The storage 204 stores application data, print data, various programs, and various setting information. In the embodiment, an SSD (Solid State Drive) is envisioned as the storage 204, but an HDD (hard disk drive) or the like may be used. A Bluetooth (registered trademark) I/F (interface) 205 is used for connecting to and using a keyboard or a pointing device 209. A network interface (I/F) 206 connects the information processing apparatus 130 to the LAN 100, a wireless LAN, or the like. A touch panel 208 connected via an operation unit I/F 207 is for drawing on a screen and detecting a touch input by a user. Note that, in the information processing apparatus 130 according to the embodiment, it is assumed that one CPU 201 uses one memory (the RAM 203) to execute processing illustrated in the flowcharts described later, but another configuration may be taken. For example, a plurality of CPUs, RAMs, ROMs, and storages may cooperate to execute the various processing illustrated in the flowcharts that are described later. The operation unit I/F 207 connects the touch panel 208 and the control unit 200. The touch panel 208 is provided with a display unit having a touch function, and functions as a display unit for displaying information and a receiving unit for accepting an instruction from a user. In addition, the control unit 200 is connected to the LAN 100 via a network I/F 206.

Figure 3:
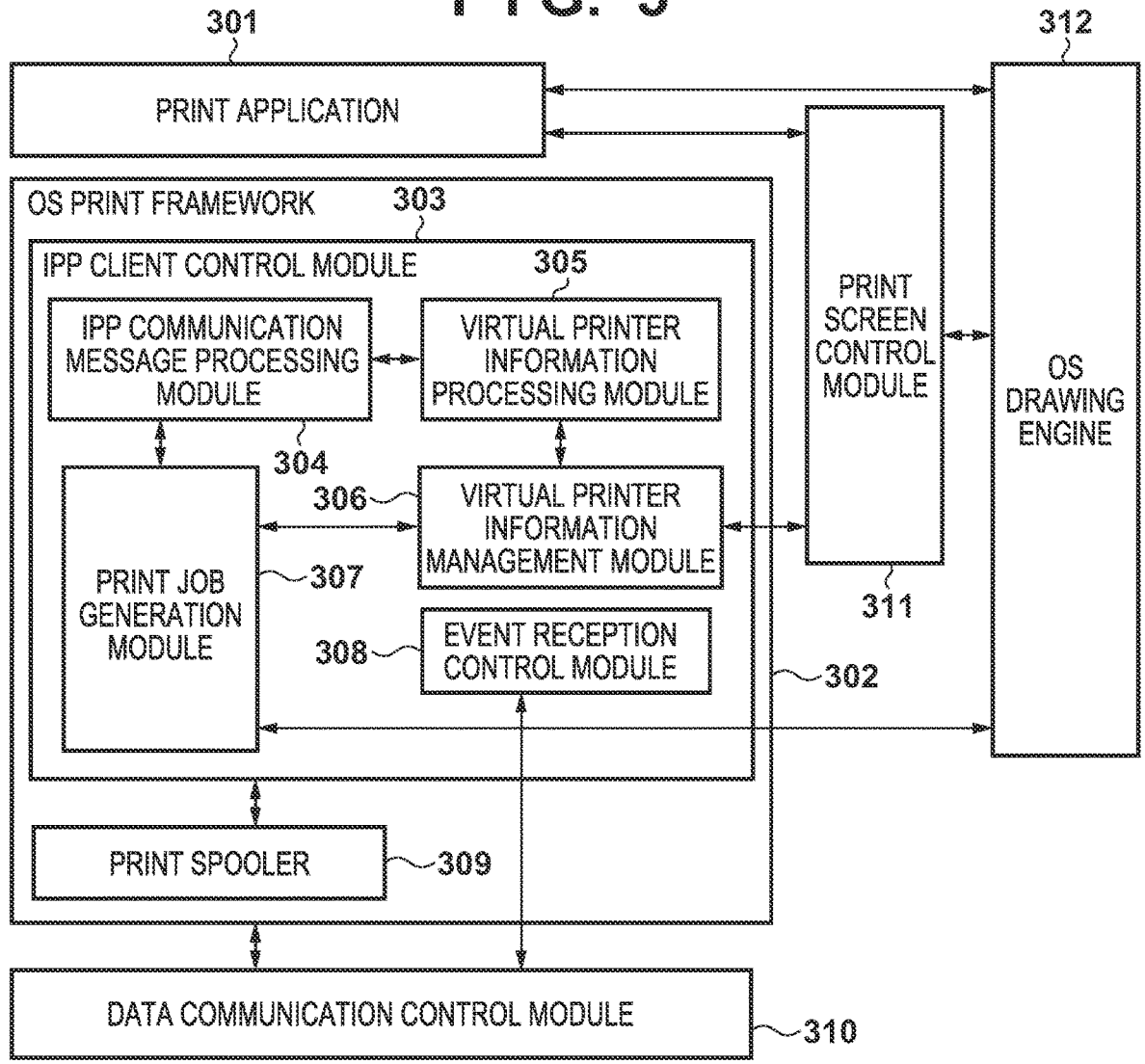
FIG. 3 is a functional block diagram for describing a software configuration of the information processing apparatus according to the embodiment.

FIG. 3 is a functional block diagram for describing a software configuration of the information processing apparatus 130 according to the embodiment. It is assumed that each functional block illustrated in FIG. 3 is achieved by the CPU 201 executing a program that has been deployed to the RAM 203.

A print application 301 is an application that operates on the information processing apparatus 130, and provides a user with general functions such as that of a word processor and a spreadsheet. Through an OS drawing engine 312 provided by an operating system (OS) on the information processing apparatus 130, the print application 301 generates data for printing in addition to drawing a GUI for user operations.

When the user calls the print function in the print application 301, the print application 301 calls a print screen control module 311. The print application 301 generates page data for printing through the OS drawing engine 312, and passes the generated page data for printing to the print screen control module 311. The print screen control module 311 obtains capability information of the virtual printer 120 from a virtual printer information management module 306, and generates a print setting UI screen corresponding to the capability information of the virtual printer 120.

An OS print framework 302 includes an IPP client control module 303 and a print spooler 309. The IPP client control module 303 includes an IPP communication message processing module 304 for generating, transmitting, and receiving IPP communication messages, a virtual printer information processing module 305 for processing information relating to the virtual printer 120, the virtual printer information management module 306 for saving capability information acquired from the virtual printer 120, a print job generation module 307 for generating a print job, and an event reception control module 308 for performing control relating to reception of a capability information update notification from the virtual printer 120. The print spooler 309 transfers, in order, print jobs generated by the IPP client control module 303 to the virtual printer 120 via the data communication control module 310.

The IPP communication message processing module 304 receives IPP communication messages, and generates and transmits IPP communication messages. A message generated by the IPP communication message processing module 304 is transmitted to the virtual printer 120 via the data communication control module 310. The virtual printer information processing module 305 obtains the capability information of the virtual printer 120 from a capability information notification message received from the virtual printer 120 by the IPP communication message processing module 304. In addition, the virtual printer information processing module 305 determines, based on the capability information notification message, whether or not saving of the capability information of the virtual printer 120 is prohibited. The virtual printer information management module 306 saves capability information of the virtual printer that is obtained by the virtual printer information processing module 305.

The event reception control module 308 performs control relating to the reception of the capability information update notification from the virtual printer 120. In a case where capability information of the virtual printer 120 has been updated, the capability information update notification is a notification from the virtual printer 120 for notifying the information processing apparatus 130 that an update of the capability information has occurred. Some information processing apparatuses cannot receive the capability information update notification from the virtual printer 120. The event reception control module 308 determines whether or not the information processing apparatus 130 can receive an event. Receiving an event refers to accepting a notification via an event delivery service provided by an OS service in cooperation with a cloud platform. Utilizing such a service, the sender of the event need not bear responsibility for retransmitting the message until the receiving side can receive it. The information processing apparatus 130 notifies the virtual printer 120 of whether or not an event can be received by a method to be described later. When the information processing apparatus 130 can receive an event, the event reception control module 308 receives the capability information update notification transmitted from the virtual printer 120, via the data communication control module 310.

Next, the virtual printer 120 will be described. The entity of the virtual printer 120 is a cloud server on the Internet 103. The virtual printer 120 holds a print job transmitted from the information processing apparatus 130. Thereafter, in response to a request from the printing device 110, the virtual printer 120 transmits the held print job to the printing device, and causes the printing device to print the print job.

Figure 4:
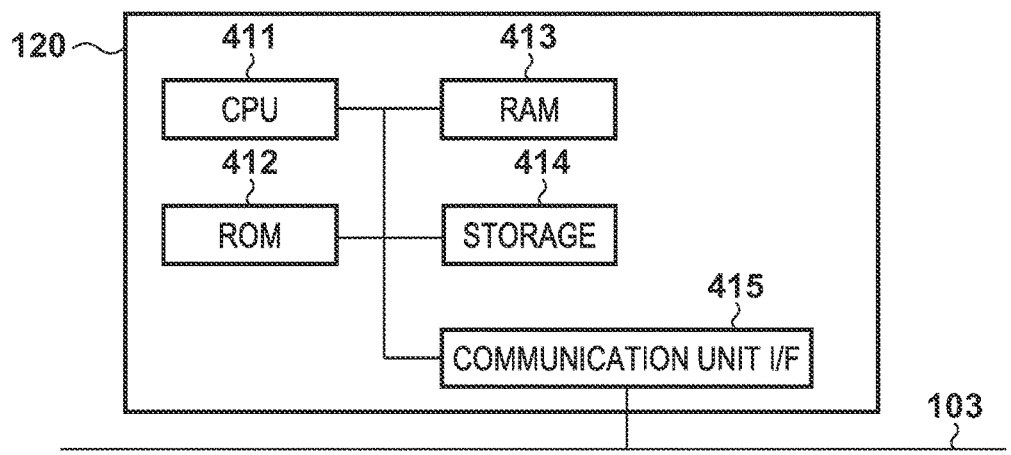
FIG. 4 is a block diagram for describing a hardware configuration of a virtual printer according to the embodiment.

FIG. 4 is a block diagram for describing a hardware configuration of the virtual printer 120 according to the embodiment. Here, since the cloud server is on the Internet, its hardware configuration is the same as that of a general PC (personal computer) or the like.

A CPU 411 deploys a program stored in a ROM 412 or a storage 414 to a RAM 413 and executes the deployed program to implement various functions and overall control of the virtual printer 120. The ROM 412 stores a control program, a boot program, and the like which can be executed by the CPU 411. The RAM 413 is a main memory of the CPU 411, and is used as a work area or a temporary storage area for deploying various control programs. The storage 414 stores print jobs, various programs, and various setting information. In the embodiment, an auxiliary storage device such as an HDD is assumed as the storage 414, but a nonvolatile memory such as an SSD may be used. The communication unit I/F 415, via the Internet 103, transmits and receives messages and print jobs to and from the information processing apparatus 130 on the LAN 100 and the printing device 110 on the LAN 102.

Figure 5:
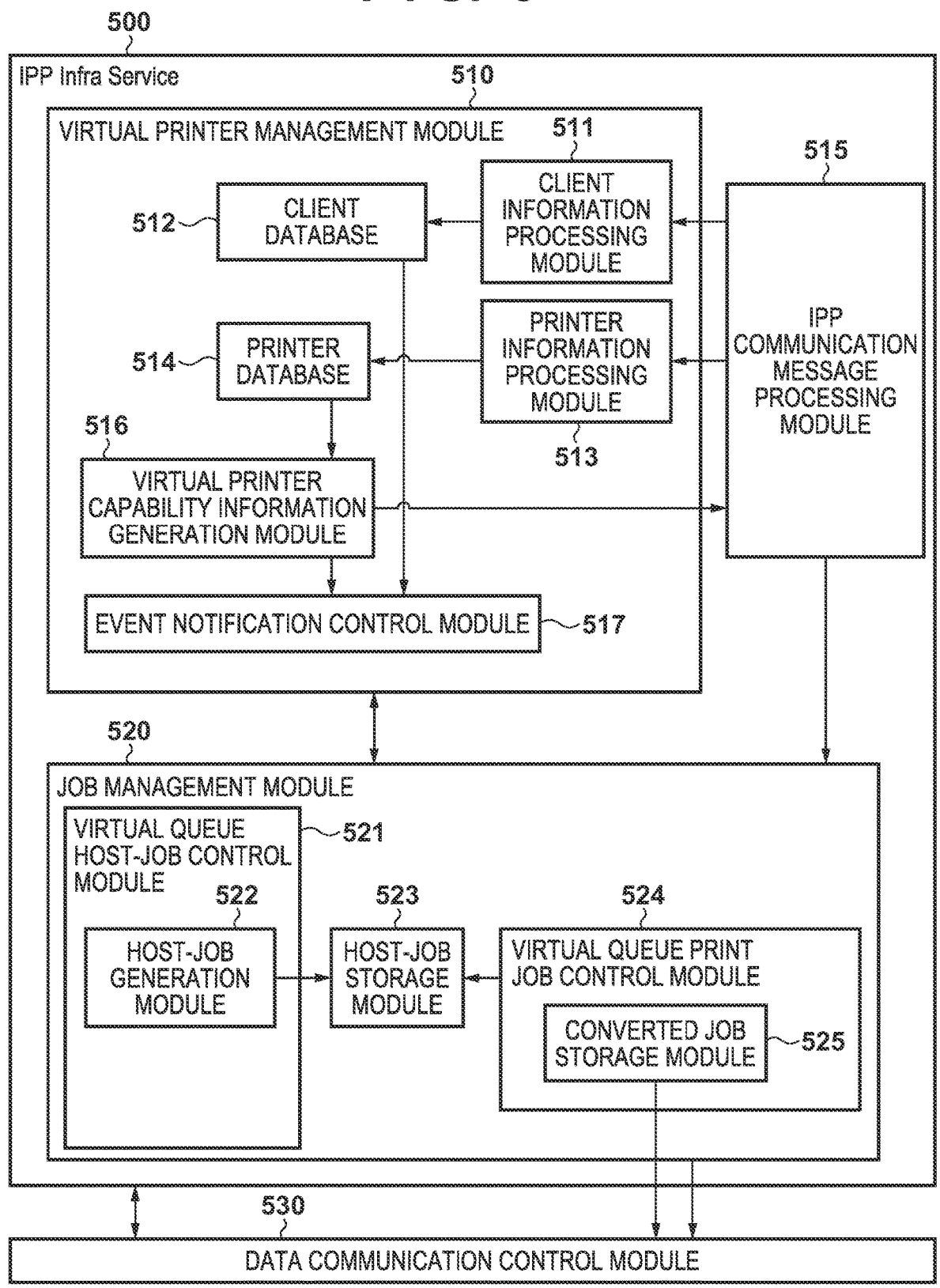
FIG. 5 is a functional block diagram for describing a software configuration of the virtual printer according to the embodiment.

FIG. 5 is a functional block diagram for describing a software configuration of the virtual printer 120 according to the embodiment. Note that, in the embodiment, it is assumed that each functional block illustrated in FIG. 5 is achieved by the CPU 411 executing a program that has been deployed to the RAM 413.

An IPP Infra Service 500 has a virtual printer management module 510 and a job management module 520. The virtual printer management module 510 manages information about the virtual printer 120. An IPP communication message processing module 515 receives, generates, and transmits IPP communication messages. A client information processing module 511 analyzes messages received by the IPP communication message processing module 515 and obtains information of the information processing apparatus 130. In addition, the client information processing module 511 determines whether or not the information processing apparatus 130 can receive an event from the message content of a capability information request received from the information processing apparatus 130. When the information processing apparatus 130 can receive events, the client information processing module 511 stores the obtained information of the information processing apparatus 130 in a client database 512. The client database 512 has an area for storing information processing apparatuses that are capable of receiving events.

A printer information processing module 513 obtains capability information of the printing device 110 corresponding to the virtual printer 120 from the IPP communication message received by the IPP communication message processing module 515. The printer information processing module 513 stores the obtained capability information of the printing device 110 in a printer database 514. The printer database 514 has an area for storing capability information of the printing device 110. When notifying the capability information of the virtual printer 120 to the information processing apparatus 130, the virtual printer capability information generation module 516 generates the capability information of the virtual printer 120 based on the capability information of the printing device 110 stored in the printer database 514, and transfers the capability information to the IPP communication message processing module 515. An event notification control module 517 performs control related to making the capability information update notification to the information processing apparatus 130.

The job management module 520 manages print jobs received from the information processing apparatus 130. A virtual queue host-job control module 521 controls the print jobs. A host-job generation module 522 obtains a print job that is obtained from the IPP communication message received by the IPP communication message processing module 515 from the information processing apparatus 130, and stores the print job in a host-job storage module 523. The host-job storage module 523 has a storage area for holding print jobs transmitted from the information processing apparatus 130. A virtual queue print job control module 524 determines whether or not a PDL format of a print job stored in the host-job storage module 523 can be handled by a printing device for executing printing. If the PDL format of the print job cannot be handled by the printing device, it is converted to a PDL format that can be handled. A print job converted in this way is stored in a converted job storage module 525. In response to a transmission request from the printing device 110, the converted job storage module 525 transmits the requested print job to the printing device 110. A data communication control module 530 controls transmission and reception of data that is performed through the communication unit I/F 415.

Figure 6A:
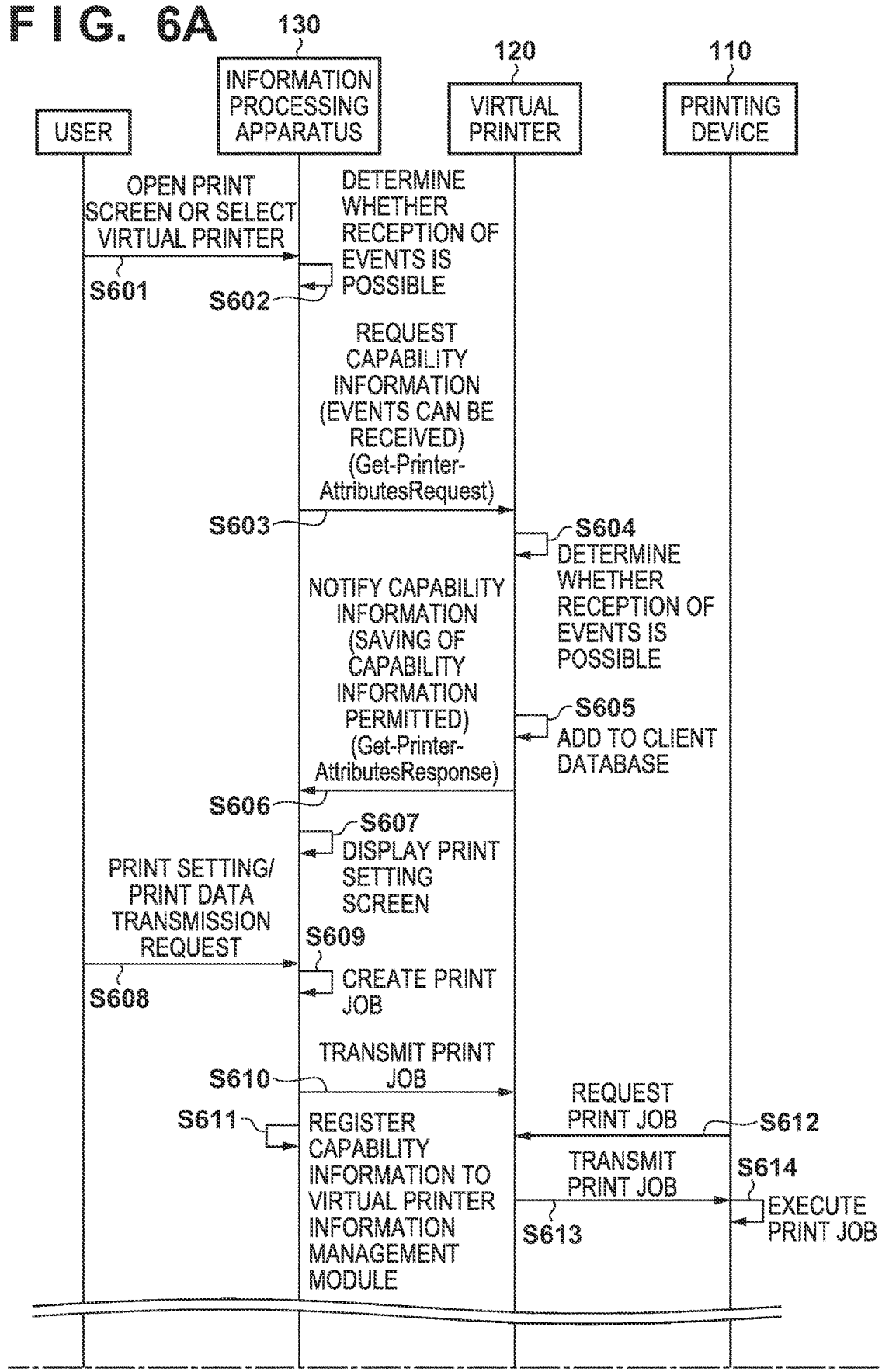
FIGS. 6A and 6B are sequence diagrams for describing an exchange of data among the information processing apparatus, the virtual printer, and a printing device in the print system according to the embodiment.
Figure 6B:
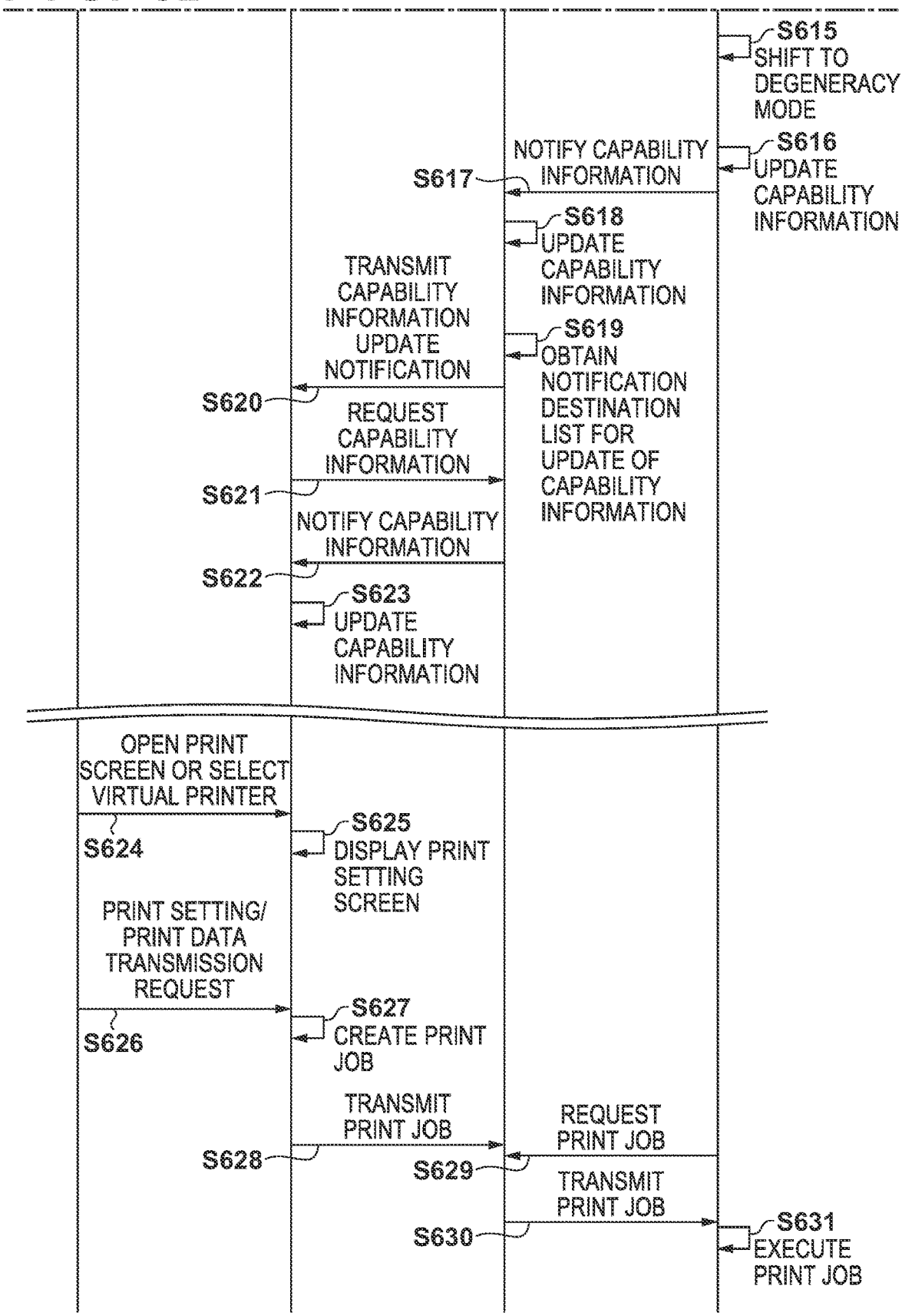

FIGS. 6A and 6B are sequence diagrams illustrating an exchange of data among the information processing apparatus 130, the virtual printer 120, and printing device 110 in the print system according to the embodiment. FIGS. 6A and 6B illustrate an example of a case in which the information processing apparatus 130 is permitted to save capability information.

In step S601, a user opens a print screen from the print application 301 of the information processing apparatus 130 and selects a virtual printer. In step S602, the information processing apparatus 130 determines whether or not it can receive events. In step S603, the information processing apparatus 130 requests capability information from the virtual printer 120. In this example, since the information processing apparatus 130 supports an event delivery service, the capability information request (Get-Printer-Attributes Request) includes information indicating a determination result indicating that the information processing apparatus 130 can receive events. Specific contents of an IPP communication message will be described later with reference to FIG. 13.

The virtual printer 120 that receives this request for capability information, in step S604, determines from the received message whether or not the information processing apparatus 130 can receive events. Here, the information processing apparatus 130 can receive events. For this reason, the virtual printer 120 registers the information processing apparatus 130 in the client database 512 in step S605. As a result, the information processing apparatus 130 is registered as an information processing apparatus that is capable of receiving the capability information update notification from the virtual printer 120. Next, in step S606, the virtual printer 120 transmits a response message in response to the capability information request received in step S603. Here, since the information processing apparatus 130 can receive events, the IPP communication message (Get-Printer-Attributes Response) to be transmitted is transmitted by including the capability information to be notified and information indicating permission to save the capability information. Specific contents of an IPP communication message will be described later with reference to FIG. 13.

As a result, in step S607, the information processing apparatus 130 generates and displays a print setting screen on the basis of the capability information received in step S606.

Thus, in step S608, the user performs a desired print setting via the displayed print setting screen, and then performs an operation of requesting that print data is be transmitted. As a result, in step S609, the information processing apparatus 130 creates a print job based on the print setting inputted by the user. Then, in step S610, the information processing apparatus 130 transmits the created print job to the virtual printer 120. At this time, in step S611, since the capability information of the virtual printer 120 is permitted to be saved by the information processing apparatus 130, the information processing apparatus 130saves the capability information obtained in step S606 in the virtual printer information management module 306.

Thereafter, in step S612, when a print job request is made from the printing device 110 to the virtual printer 120, in step S613, the virtual printer 120 transmits the requested print job to the printing device. As a result, the printing device 110 executes the print job in step S614, and a print product desired by the user is obtained.

After the information processing apparatus 130 creates and transmits the first print job in this manner, in step S615, a printing device of the printing device 110 (for example, the printing device 111) shifts to the degeneracy mode, and usable functions are reduced. Accordingly, in step S616, the printing device 110 updates its own capability information. Then, in step S617, the printing device 110 notifies the virtual printer 120 of the changed capability information of the printing device 110. For example, in the example of FIG. 1, if the stapling function of the printing device 112 cannot be used due to waiting for replenishment of staples, the capability information becomes, from the logical AND of the capabilities of the two printing devices 111 and 112, only a function of printing to A3-sized sheets.

As a result, in step S618, the virtual printer 120 updates the capability information of the virtual printer 120 based on the capability information of the printing device 110 that was obtained in step S617. Along with the update of the capability information of the virtual printer 120, in step S619, the virtual printer 120 obtains a capability information update notification destination list from the client database 512. The capability information update notification destination list indicates a list of information processing apparatuses that the virtual printer 120 has permitted to save the capability information.

Then, in step S620, the virtual printer 120 transmits the capability information update notification to an information processing apparatus that is to be updated, which is included in the list obtained in step S619. The capability information update notification for notifying the information processing apparatus 130 that the capability information has been updated in the virtual printer 120. Note that timings (times) at which the capability information update notifications are distributed to the respective devices in step S620 may be appropriately shifted and distributed. This has an effect of distributing the timings of requests for reobtaining of capability information that are requested from each device. As a result, a large number of requests are suppressed from being transmitted to the virtual printer 120 at the same timing, and the load per unit time on the virtual printer 120 can be reduced.

In step S621, the information processing apparatus 130 that has received the capability information update notification requests the virtual printer 120 for the updated capability information, and, in step S622, the information processing apparatus 130 obtains the updated capability information from the virtual printer 120. Then, in step S623, the information processing apparatus 130 updates the capability information of the virtual printer 120 saved in the virtual printer information management module 306 based on the obtained capability information. As a result, the capability information of the printing device 110 is synchronized with the capability information of the virtual printer 120 saved by the information processing apparatus 130.

Next, in step S624, the user opens a print screen using the information processing apparatus 130, and selects a virtual printer. In step S625, the information processing apparatus 130 accesses the virtual printer information management module 306, and creates and displays a print setting screen based on the capability information of the virtual printer 120 that was updated in step S623. Thus, in step S626, the user performs a desired print setting via the displayed print setting screen, and then performs an operation for transmitting the print data. As a result, in step S627, the information processing apparatus 130 creates a print job based on the print setting inputted by the user, and, in step S628, transmits the print job to the virtual printer 120. Then, in step S629 to step S631, similarly to step S612 to step S614 described above, the printing device 110 requests the virtual printer 120 for a print job, and the virtual printer 120 transmits the requested print job to the printing device, whereby the printing device 110 executes print processing in accordance with the print job.

In this fashion, when the information processing apparatus 130 can receive events from the virtual printer 120, the virtual printer 120 permits the information processing apparatus 130 to save the capability information of the virtual printer 120. When the capability information of the printing device 110 is updated and the capability information stored in the virtual printer 120 is updated, the capability information update notification is transmitted to the information processing apparatus 130. As a result, the information processing apparatus 130 reobtains the capability information stored in the virtual printer 120 in response to the capability information update notification. As a result, the information processing apparatus 130 can create a print job in accordance with the latest capability information of the virtual printer 120.

Figure 7:
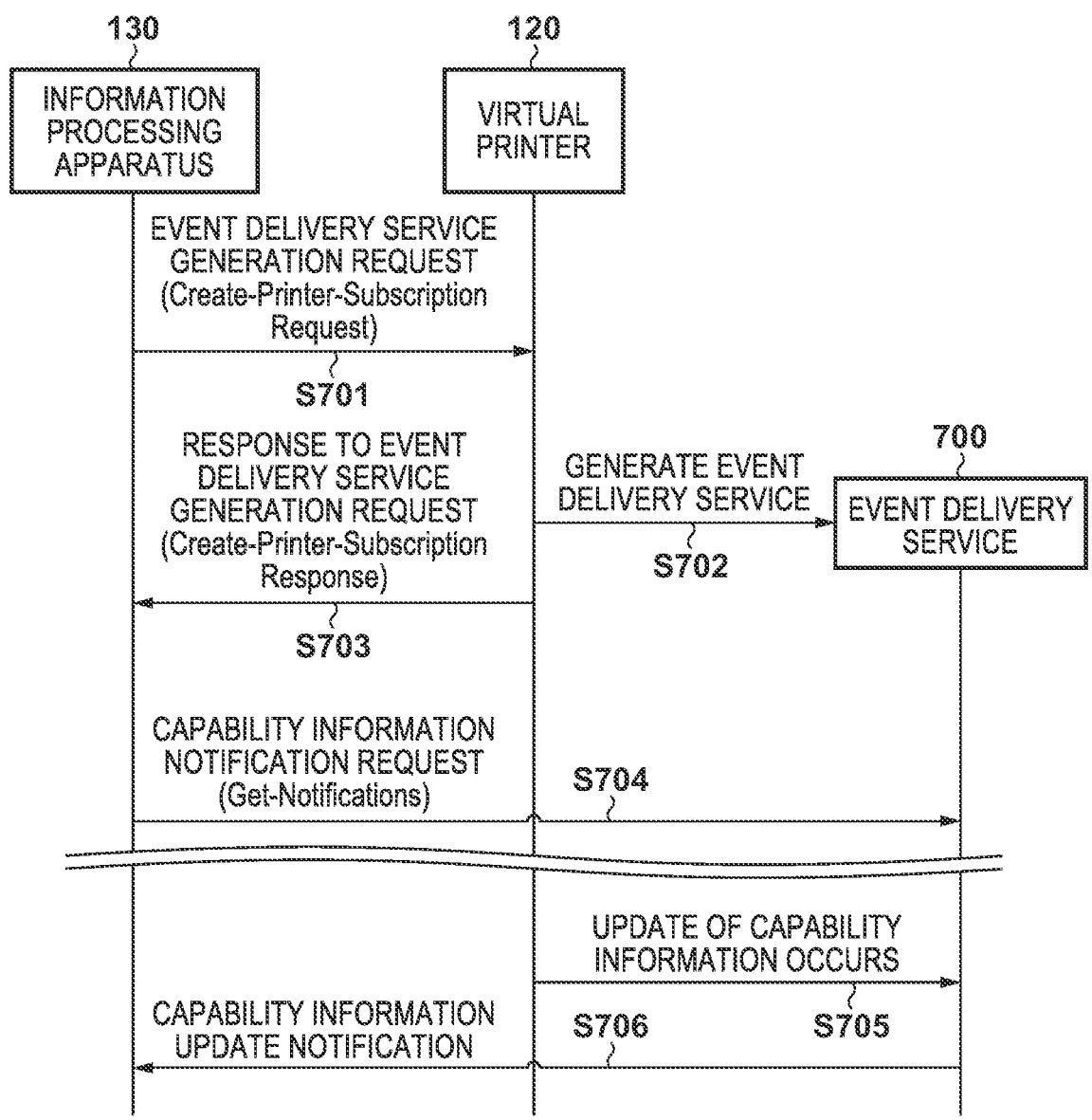
FIG. 7 is a sequence diagram for describing processing for updating capability information of the virtual printer in a case where saving of the capability information by the information processing apparatus according to the embodiment is prohibited.

FIG. 7 is a sequence diagram for describing processing for updating the capability information of the virtual printer 120 in a case where saving of the capability information by the information processing apparatus 130 according to the embodiment is prohibited.

In step S701, the information processing apparatus 130 requests the virtual printer 120 to generate an event delivery service 700. The event delivery service 700 operates on the event delivery server 140 and monitors the state of the virtual printer 120. When the event delivery service 700 detects an update of the capability information of the virtual printer 120, it notifies the information processing apparatus 130 of the update of the capability information.

In step S702, the virtual printer 120 generates the event delivery service 700 in the event delivery server 140. In step S703, the virtual printer 120 transmits a response to the request to generate the event delivery service to the information processing apparatus 130. By this response, the virtual printer 120 notifies the information processing apparatus 130 that the event delivery service 700 has been successfully generated.

Thus, in step S704, the information processing apparatus 130 requests the event delivery service 700 to notify updated capability information.

Thereafter, when the capability information of the virtual printer 120 is updated in step S705, the event delivery service 700 detects that the capability information of the virtual printer 120 has been updated. In step S706, the event delivery service 700 notifies the information processing apparatus 130 that the capability information of the virtual printer 120 has been updated. In this way, the information processing apparatus 130 can detect that the capability information of the virtual printer 120 has been updated by receiving the capability information update notification.

Figure 8A:
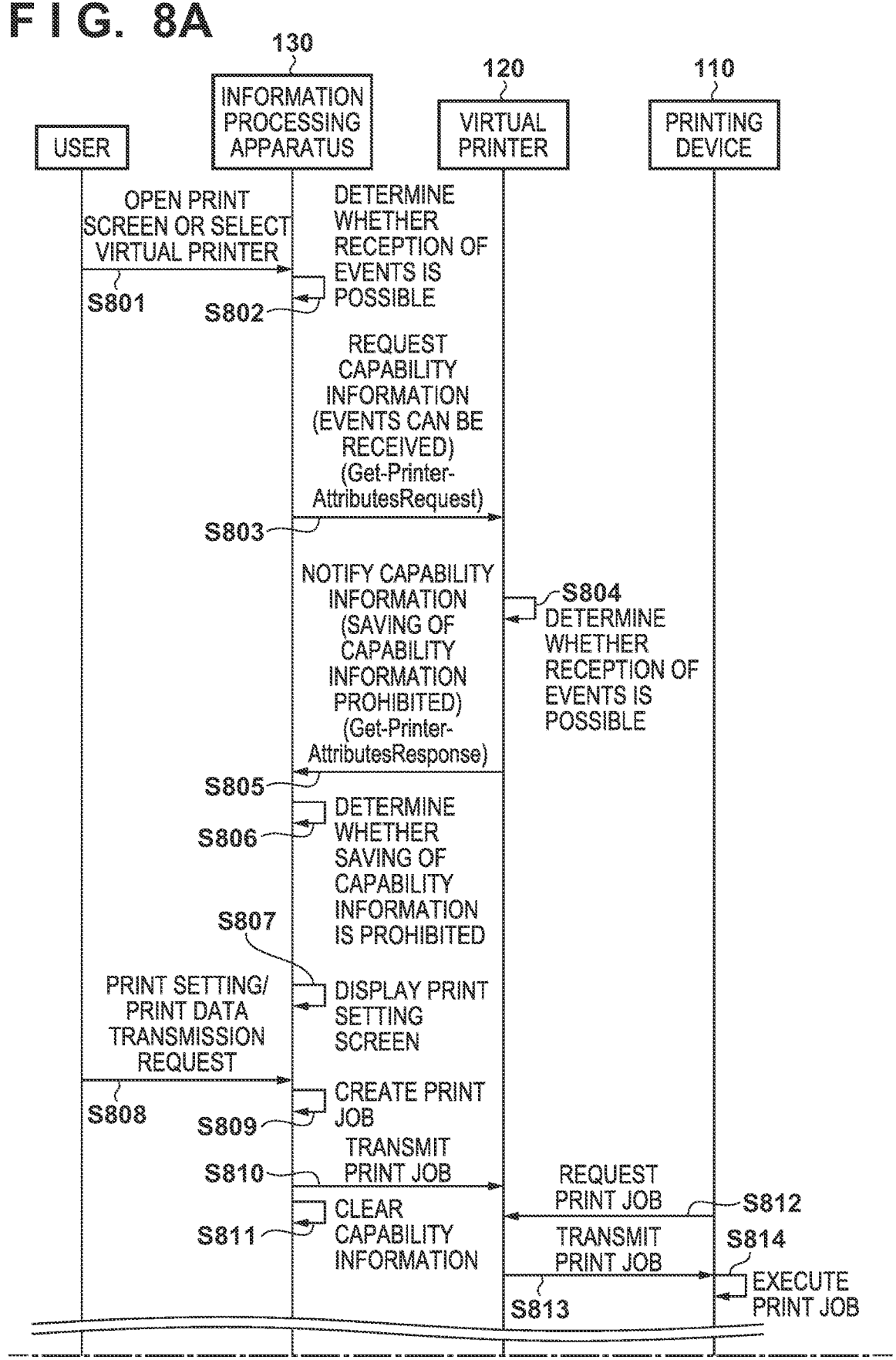
FIGS. 8A and 8B are sequence diagrams for describing an exchange of data among the information processing apparatus, the virtual printer, and the printing device in the print system according to the embodiment.
Figure 8B:
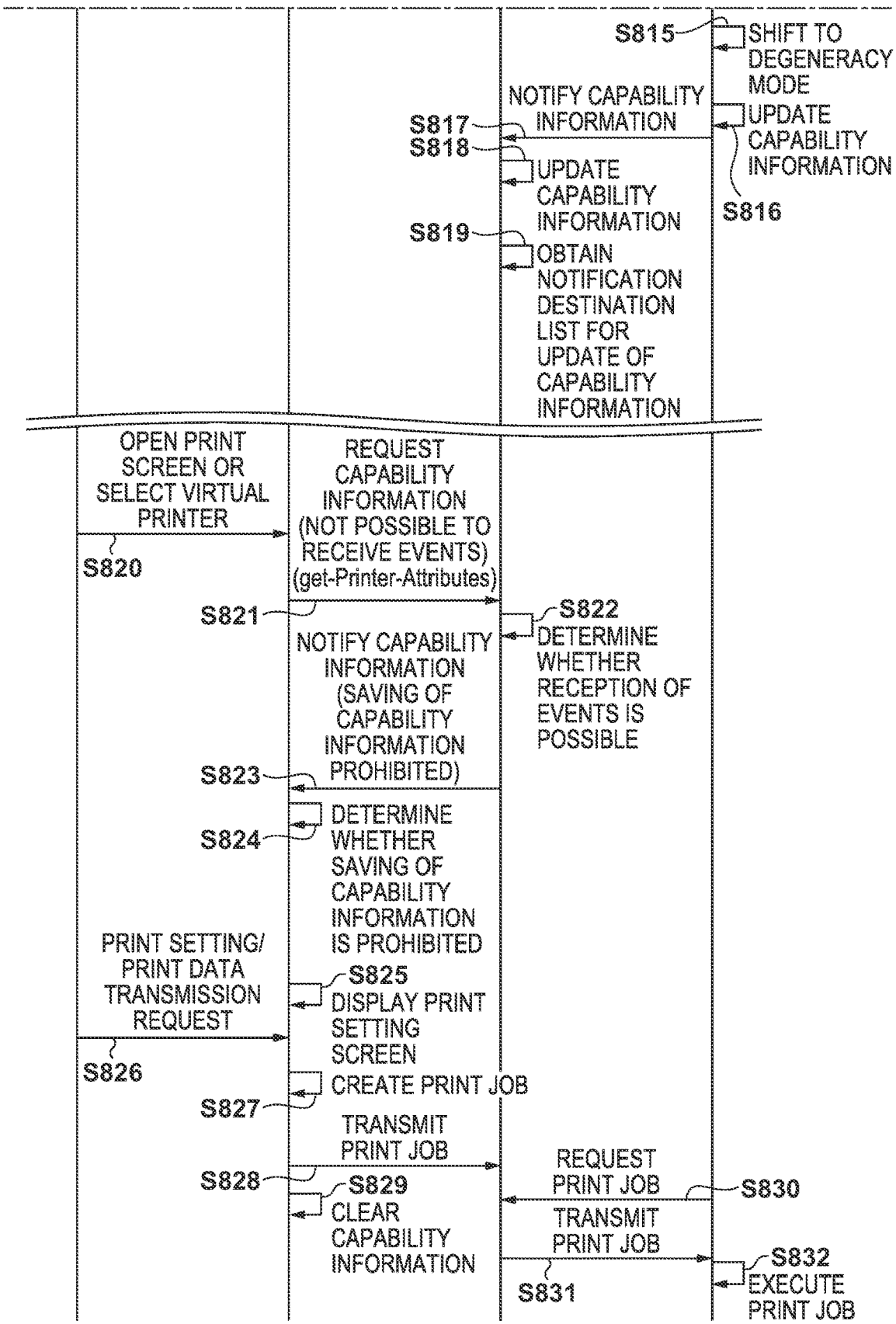

FIGS. 8A and 8B are sequence diagrams for describing an exchange of data among the information processing apparatus 130, the virtual printer 120, and printing device 110 in the print system according to the embodiment. Note that FIGS. 8A and 8B differ from FIGS. 6A and 6B which were described above, and illustrate an example of a case in which the information processing apparatus 130 is prohibited from saving capability information.

In step S801, a user opens a print screen from the print application 301 of the information processing apparatus 130 and selects a virtual printer. As a result, in step S802, the information processing apparatus 130 determines whether or not the information processing apparatus can receive events. Here, description is given by assuming that the information processing apparatus 130 cannot receive an event. In step S803, the information processing apparatus 130 requests the virtual printer 120 for capability information. In this example, since the information processing apparatus 130 does not support event delivery, the capability information request (Get-Printer-Attributes Request) includes information indicating that the information processing apparatus 130 cannot receive events. Specific contents of an IPP communication message will be described later with reference to FIG. 13.

In step S804, the virtual printer 120 determines whether or not the information processing apparatus 130 can receive events based on the IPP communication message received from the information processing apparatus 130. In this example, since the information processing apparatus 130 cannot receive events, the virtual printer 120 does not register the information processing apparatus in the client database 512. Next, in step S805, the virtual printer 120 transmits a response message in response to the capability information request received in step S803. Here, since the information processing apparatus 130 cannot receive events, the IPP communication message (Get-Printer-Attributes Response) is transmitted by including the capability information to be notified and information indicating that saving of the capability information is prohibited. A specific message will be described later with reference to FIG. 13.

In step S806, the information processing apparatus 130 determines, from the received capability information response message, whether or not it is prohibited from saving capability information. Thus, in step S807, the information processing apparatus 130 generates and displays a print setting screen on the basis of the received capability information.

Next, in step S808, the user performs a desired print setting via the print setting screen, and then requests the information processing apparatus 130 to transmit the print data.

As a result, in step S809, the information processing apparatus 130 creates a print job based on the print setting inputted by the user. Then, in step S810, the information processing apparatus 130 transmits the created print job to the virtual printer 120. In step S811, since the information processing apparatus 130 is prohibited from saving the capability information of the virtual printer 120, the information processing apparatus 130 discards the capability information received in step S805 without saving it. This is a point by which step S811 differs greatly from step S611 of FIG. 6A described above.

Then, in step S812 to step S814, similarly to step S612 to step S614 of FIG. 6A described above, the printing device 110 requests the virtual printer 120 for a print job, and the virtual printer 120 transmits the requested print job to the printing device. As a result, the printing device 110 executes print processing according to the print job in step S814, and a print product desired by the user is obtained.

In this manner, after the information processing apparatus 130 creates and transmits the first print job, the printing device 110 shifts to the degeneracy mode in step S815, and usable functions of the printing device 110 are reduced. Accordingly, in step S816, the printing device 110 updates its own capability information in response to this degeneration. Then, in step S817, the printing device 110 notifies the virtual printer 120 of the updated capability information of the printing device 110. This is the same as step S615 to step S617 of FIG. 6B described above.

As a result, in step S818, the virtual printer 120 updates the capability information. Along with the update of the capability information of the virtual printer 120, in step S819, the virtual printer 120 obtains a capability information update notification destination list from the client database 512. In this example, since the information processing apparatus 130 is not registered in the client database 512, the virtual printer 120 does not transmit the capability information update notification to the information processing apparatus 130. Therefore, the virtual printer 120 does not make the capability information update notification to the information processing apparatus 130 as illustrated in step S620 to step S623 of FIG. 6B.

After the capability information of the virtual printer 120 is updated in this manner, the user creates a print job again. In step S820, a user opens a print screen from the print application 301 of the information processing apparatus 130 and selects the virtual printer 120. In step S821, the information processing apparatus 130 then makes a request to the virtual printer 120 for its capability information, including information indicating that the reception of events is not possible.

As a result, in step S822, the virtual printer 120 determines whether or not the information processing apparatus 130 can receive events based on the received IPP communication message. In step S823, because the information processing apparatus 130 cannot receive events, the virtual printer 120 notifies the information processing apparatus 130 of capability information that includes information indicating that saving of the capability information is prohibited.

In step S824, the information processing apparatus 130 determines, from the received capability information response message, whether or not it is prohibited from saving the capability information. Thus, in step S825, the information processing apparatus 130 generates and displays a print setting screen from the received capability information.

Next, in step S826, the user performs a desired print setting via the print setting screen, and then requests transmission of the print data. As a result, in step S827, the information processing apparatus 130 creates a print job based on the print setting inputted by the user. Then, in step S828, the information processing apparatus 130 transmits the created print job to the virtual printer 120. In step S829, the information processing apparatus 130 discards the capability information of the virtual printer 120 without registering it in the virtual printer information management module 306 because it is prohibited from saving capability information. Note that, since the sequence of creating a print job after an update of the capability information of the virtual printer 120 is the same as the sequence of the above-described step S801 to step S814, a description thereof is omitted. The processing of step S830 to step S832 is also the same as the processing of step S812 to step S814 described above, and therefore description thereof is omitted.

As described above, when the information processing apparatus 130 cannot receive events from the virtual printer 120, the virtual printer 120 prohibits the information processing apparatus 130 from saving the capability information of the virtual printer 120. Thus, after creating a print job, the information processing apparatus does not save the capability information, and obtains the capability information from the virtual printer 120 each time a print job is created. As a result, even when the information processing apparatus cannot receive an event, the information processing apparatus 130 can create a print job based on the latest capability information of the virtual printer 120.

Figure 9:
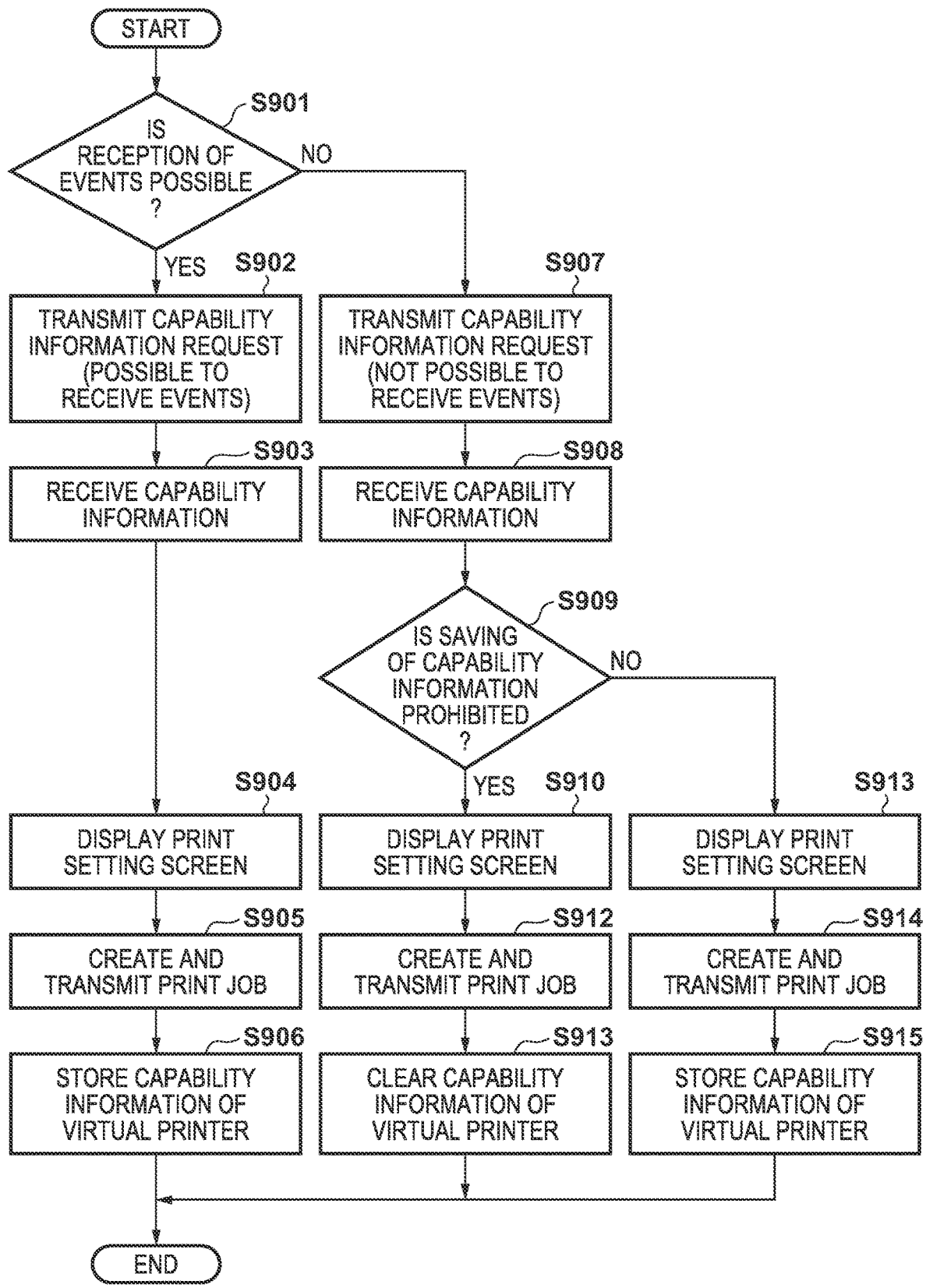
FIG. 9 is a flowchart for describing processing executed by the information processing apparatus according to the embodiment.

FIG. 9 is a flowchart for describing processing executed by the information processing apparatus 130 according to the embodiment. Note that the processing illustrated in the flowchart is realized by the CPU 201 executing a program that has been deployed to the RAM 203. Note that the processing described in this flowchart is processing from after a user selects the virtual printer 120 on the print screen until a first print job is transmitted to the virtual printer 120.

Firstly, in step S901, the CPU 201 functions as the event reception control module 308, and determines whether or not the information processing apparatus 130 is able to receive events. If it is determined that events can be received, the processing proceeds to step S902, and if not, the processing proceeds to step S907. In step S902, the CPU 201 functions as the IPP communication message processing module 304, generates a capability information request message that includes information indicating that the information processing apparatus 130 is able to receive events, and transmits the request message to the virtual printer 120 through the data communication control module 310.

Subsequently, in step S903, the CPU 201 functions as the IPP communication message processing module 304, and receives a response message from the virtual printer 120 through the data communication control module 310. The CPU 201 functions as the virtual printer information processing module 305, obtains capability information from the received response message, and temporarily stores the capability information in the RAM 203.

Next, in step S904, the CPU 201 functions as the print screen control module 311, and, in response to a user operation, creates a print setting screen using the capability information obtained by the virtual printer information processing module 305, and displays the print setting screen on the touch panel 208 via the operation unit I/F 207. Then, in step S905, the CPU 201 functions as the IPP client control module 303, and obtains, from the print screen control module 311, setting content inputted by the user through the print setting screen. The CPU 201 functions as the print job generation module 307, and generates a print job based on the print data generated by the print application. The CPU 201 stores the generated print job in the print spooler 309, and transmits it in turn to the virtual printer 120 via the data communication control module 310. The processing proceeds to step S906, and the CPU 201 functions as the virtual printer information processing module 305, registers the capability information saved in the RAM 203 in the virtual printer information management module 306, and ends this processing.

On the other hand, when the information processing apparatus 130 determines in step S901 that events cannot be received, the processing proceeds to step S907. In step S907, the CPU 201 functions as the IPP communication message processing module 304, generates a capability information request message that includes information indicating that the information processing apparatus 130 cannot receive events, and transmits the request message to the virtual printer 120 through the data communication control module 310. Then, in step S908, the CPU 201 functions as the IPP communication message processing module 304, and upon receiving a response message from the virtual printer 120, obtains capability information from the received response message and temporarily stores the capability information in the RAM 203.

Next, the processing proceeds to step S909, and the CPU 201 functions as the virtual printer information processing module 305, and determines whether or not saving of capability information is prohibited from the content of the received response message. If it is determined that saving of capability information is prohibited, the processing proceeds to step S910. In step S910, the CPU 201 functions as the print screen control module 311, creates a print setting screen using the obtained capability information, and displays the print setting screen on the touch panel 208 via the operation unit I/F 207. Then, in step S911, the CPU 201 functions as the print job generation module 303, and obtains setting content that has been inputted by a user. The CPU 201 functions as the print job generation module 307, generates a print job based on the print settings, and transmits the print job to the virtual printer 120. The processing proceeds to step S912, and the CPU 201 functions as the virtual printer information processing module 305, clears (discards) the capability information saved in the RAM 203 in the virtual printer information management module 306 without registering it, and ends this processing.

On the other hand, when it is determined in step S909 that saving of the capability information is not prohibited, the processing proceeds to step S913. In step S913, the CPU 201 displays a print setting screen in the same manner as in the step S904 and step S910, and then, in step S914, creates and transmits a print job in the same manner as in step S905 and step S911. The processing proceeds to step S915, and the CPU 201 functions as the virtual printer information processing module 305, registers the capability information saved in the RAM 203 in the virtual printer information management module 306, and ends this processing.

By this processing, the information processing apparatus 130 can store the capability information obtained from the virtual printer 120 if it can receive events, and therefore, can create a print job according to the capability information without making a query to the virtual printer 120 each time. If the information processing apparatus cannot receive events and is prohibited from storing the capability information, the information processing apparatus does not store the capability information obtained from the virtual printer 120. As a result, when the capability information of the virtual printer changes, there ceases to be a difference between the capability information of the virtual printer saved by the information processing apparatus and the capability information of the actual virtual printer.

Figure 10:
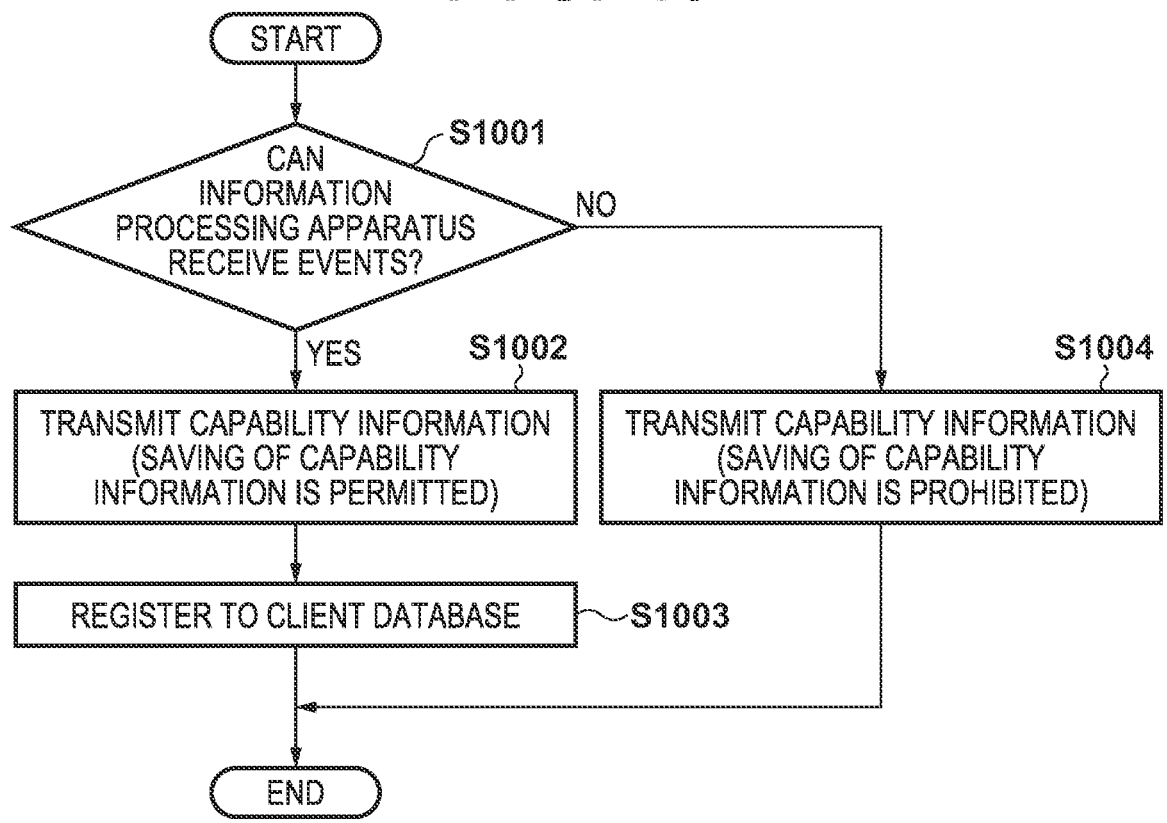
FIG. 10 is a flowchart for describing processing by the virtual printer according to the embodiment.

FIG. 10 is a flowchart for describing processing by the virtual printer 120 according to the embodiment. Note that the processing described in the flowchart is realized by the CPU 411 executing a program that has been deployed to the RAM 413. Here, description is given for processing where the virtual printer 120 receives a request for capability information from the information processing apparatus 130, and notifies the information processing apparatus 130 of capability information.

Firstly, in step S1001, the CPU 411 functions as the client information processing module 511 and, based on event reception enable/disable information 1302 notified in a capability information request message 1301 (FIG. 13) which will be described later, determines whether or not the information processing apparatus 130 is able to receive events (capability information update notifications) via the event delivery server 140. If upon determining that the information processing apparatus 130 is able to receive events, the processing proceeds to step S1002. In step S1002, the CPU 411 functions as the virtual printer capability information generation module 516, generates capability information of the virtual printer 120 based on the capability information of the printing device 110 stored in the printer database 514, and transfers the capability information to the IPP communication message processing module 515. Accordingly, in order to permit the information processing apparatus 130 to save the capability information, the IPP message processing module 515 generates a capability information notification message that includes information permitting saving of the capability information, and transmits the capability information notification message to the information processing apparatus 130 through the data communication control module 530. Then, the processing proceeds to step S1003, and the CPU 411 functions as the client information processing module 511, registers the information processing apparatus 130 in the client database 512 that registers the information processing apparatuses that are permitted to save the capability information, and ends the processing.

When the CPU 411 determines in step S1001 that the information processing apparatus 130 cannot receive events, the processing proceeds to step S1004. In step S1004, the CPU 411 functions as the virtual printer capability information generation module 516, generates the capability information of the virtual printer 120 based on the capability information of the printing device 110 stored in the printer database 514, and transfers the capability information to the IPP communication message processing module. At this time, the CPU 411 functions as the IPP message processing module 515, generates a capability information notification message that includes information for prohibiting the information processing apparatus 130 from saving the capability information, and transmits the capability information notification message to the information processing apparatus 130.

By this processing, an information processing apparatus which is not able to receive capability information update notifications is prohibited from saving the capability information, and is not registered as an information processing apparatus to which the capability information update notifications are to be transmitted. In contrast, an information processing apparatus which is able to receive capability information update notifications is permitted to save the capability information, and is registered as an information processing apparatus to which the capability information update notifications are to be transmitted. As a result, when the capability information is updated, since an update notification thereof is sent to registered information processing apparatuses, there is no inconsistency between the capability information saved by an information processing apparatus and the capability information of the virtual printer.

Figure 11:
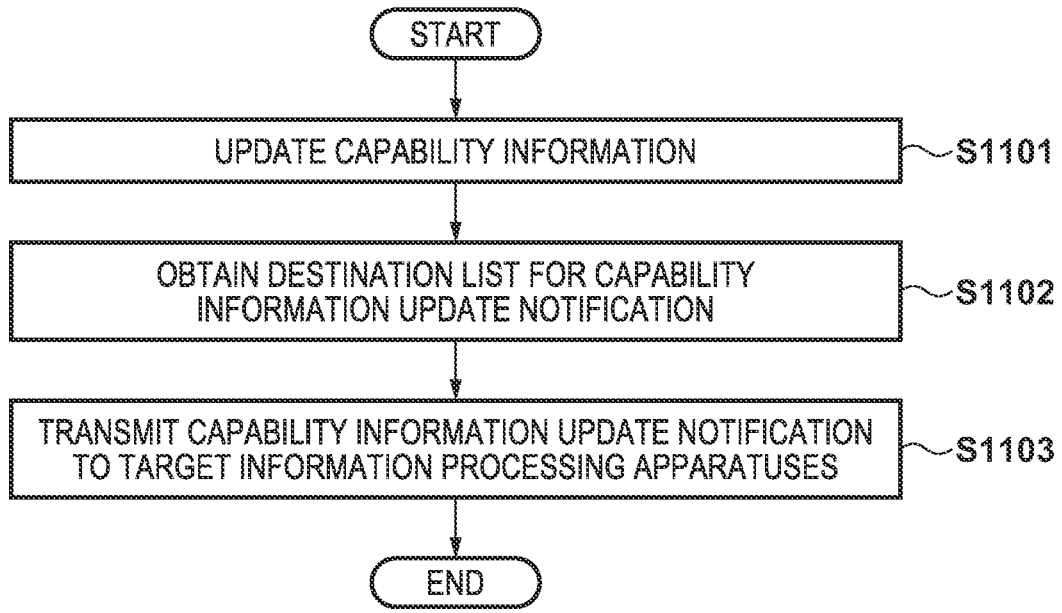
FIG. 11 is a flowchart for describing processing by the virtual printer according to the embodiment.

FIG. 11 is a flowchart for describing processing by the virtual printer 120 according to the embodiment. Note that the processing described in the flowchart is realized by the CPU 411 executing a program that has been deployed to the RAM 413. Here, description is given for operation when the virtual printer 120 updates the capability information of the virtual printer 120, after permitting the information processing apparatus 130 to save the capability information.

Firstly, in step S1101, the CPU 411 functions as the IPP communication message processing module 515, and receives the capability information notification message from the printing device 110 through the data communication control module 530. The CPU 411 functions as the printer information processing module 513, obtains the latest capability information of the printing device 110 from the received message, and stores the latest capability information in the printer database 514. In this manner, the virtual printer capability information generation module 516 updates the capability information of the virtual printer 120 based on the capability information of the printing device 110 stored in the printer database 514. Next, the processing proceeds to step S1102, and the CPU 411 functions as the event notification control module 517, and obtains, from the client database 512, a list of information processing apparatuses for which the capability information update notification is necessary. Then, the processing proceeds to step S1103, and the CPU 411 functions as the event notification control module 517, and notifies the information processing apparatuses which are transmission targets and are included in the obtained list, of the update of the capability information through the data communication control module 530.

By this processing, when the capability information of printing devices that are managed in aggregation is updated, the virtual printer can transmit an update notification to the registered information processing apparatuses.

Figure 12:
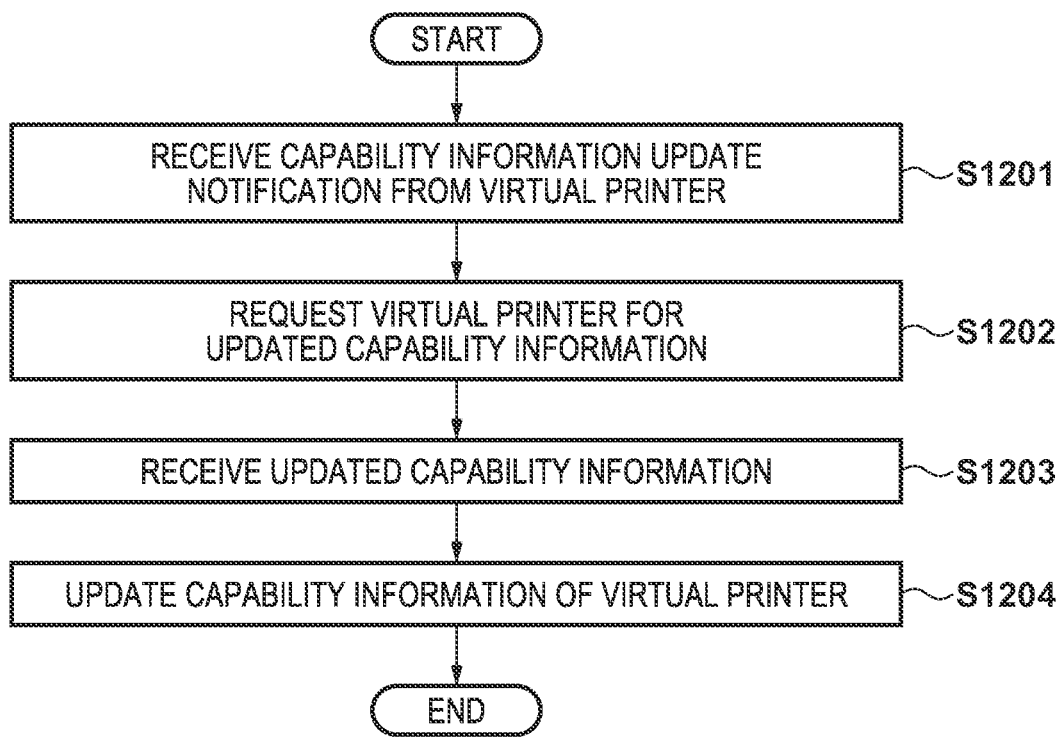
FIG. 12 is a flowchart for describing processing by the information processing apparatus according to the embodiment.

FIG. 12 is a flowchart for describing processing by the information processing apparatus 130 according to the embodiment. Note that the processing described in the flowchart is realized by the CPU 201 executing a program that has been deployed to the RAM 203. This processing indicates operation for a time of updating the capability information of the virtual printer 120 when the information processing apparatus 130 is permitted to save capability information.

Firstly, in step S1201, the CPU 201 functions as the event reception control module 308, and receives the capability information update notification from the virtual printer 120. Next, the processing proceeds to step S1202, and the CPU 201 functions as the IPP communication message processing module 306, generates a message requesting the updated capability information, and transmits the generated message to the virtual printer 120. Next, the processing proceeds to step S1203, and the CPU 201 functions as the virtual printer information management module 306, and obtains the updated capability information of the virtual printer 120 from the capability information notification message received by the IPP communication message processing module 304. The processing proceeds to step S1204, and the CPU 201 functions as the virtual printer information processing module 305, updates the capability information of the virtual printer 120 saved in the virtual printer information management module 306, and ends this processing.

In this way, the information processing apparatus is able to update the saved capability information of the virtual printer to the latest capability information.

FIG. 13 depicts a view illustrating an example of a message for IPP communication between the information processing apparatus 130 and the virtual printer 120 according to the embodiment. The example of FIG. 13 illustrates a case where the information processing apparatus 130 is not able to receive event notifications.

Reference numeral 1301 denotes an example of (Get-Printer-Attributes Request) capability information request message transmitted from the virtual printer 120 to the information processing apparatus 130. The capability information request message 1301 includes event reception enable/disable information 1302. The event reception enable/disable information 1302 is information indicating whether or not the information processing apparatus 130 is able to receive an event via the event delivery server 140. The value of "event-notification-supported" is "true" when the information processing apparatus 130 is able to receive events, and "false" when it is not able to receive events. In FIG. 13, since the information processing apparatus 130 is not able to receive events, the value of "event-notification-supported" is "false".

The client information processing module 511 of the virtual printer 120 refers to the event reception enable/disable information 1302 included in the received capability information request message 1301, and determines whether or not the information processing apparatus 130 is able to receive events.

Reference numeral 1303 indicates an example of a capability information response message (Get-Printer-Attributes Response) from the virtual printer 120 in response to the capability information request message 1301. The response message 1303 includes capability information save permission/prohibition information 1304. The capability information save permission/prohibition information 1304 is information indicating whether saving of capability information, which is to be notified to the information processing apparatus 130 by the response message 1303, is prohibited or permitted. The value of "attributes-save-prohibited" is "true" when the virtual printer 120 prohibits the information processing apparatus 130 from saving capability information, and "false" when the saving of capability information is permitted. In FIG. 13, the virtual printer 120 has determined that the information processing apparatus 130 is not able to receive events from the capability information request message 1301. Therefore, in order to prohibit the information processing apparatus 130 from saving notified capability information, the virtual printer 120 has set the value of "attributes-save-prohibited" to "true" as shown in the information 1304. The information 1304 is an example of information for restricting the saving of capability information, and there is no limitation to this. For example, instead of the information 1304, information indicating a cacheable expiration date or the like may be notified. For the expiration date, it is possible to apply, for example, 30 minutes or 12 hours. It is possible to make it so that the expiration date can be changed by an administrator or the like of the virtual printer 120.

The virtual printer information processing module 305 of the information processing apparatus 130 refers to the save permission/prohibition information 1304, which indicates whether saving of the capability information included in a received response message 1302 is prohibited or permitted, and after creating a print job, determines whether or not to save the obtained capability information of the virtual printer 120. Note that, when notifying an expiration date instead of the save permission/prohibition information 1304, the information processing apparatus 130, at a timing of step S601 of FIG. 6A, determines whether or not the saved capability information has passed the expiration date. When it is determined that the expiration date has expired, the capability information is requested again, new capability information is obtained from the virtual printer 120, and this capability information is saved. On the other hand, when it is determined that the expiration date has not expired, the saved capability information is used as it is.

According to the embodiment as described above, even when capability information of a virtual printer dynamically changes, it is possible to create a print job based on the latest capability information of the virtual printer in an information processing apparatus, which is used by a user, regardless of whether or not the information processing apparatus is able to receive events. As a result, even when the capability information of the virtual printer dynamically changes, it is possible to prevent the occurrence of a situation in which the information processing apparatus creates a print job that cannot be executed by a printing device.

(Variation)

In the embodiment described above, description was given assuming a configuration in which a push notification is sent from a virtual printer when the capability information changes, but there is no limitation to this. For example, configuration may be taken to respond to any information processing apparatus with capability information along with information for suppressing cache use of the capability information. In such a case, the CPU 411 of the virtual printer 120, which has received a capability information request, may transmit, as a response to the request, a capability information notification that includes information (prohibition information or information indicating an expiration date) for restricting the saving of capability information, which was described in step S1004 of FIG. 10.

In the embodiment described above, a print setting screen is created by an information processing apparatus based on the capability information received from a virtual printer, but the present invention is not limited to this. For example, a virtual printer may create print screen information in response to a request for capability information from an information processing apparatus, and transmit the print screen information to the information processing apparatus together with the requested capability information.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-162104, filed Aug. 30, 2018, which is hereby incorporated by reference herein in its entirety.

What is claimed is:

1. A system operable to save a print job received from an information processing apparatus and transmit the print job to one printing device among a plurality of printing devices that are registered in advance, in response to a request from the one printing device,
wherein the system comprises a server,
wherein the server includes a controller including a processor and a memory device, and the controller is configured to:
generate capability information for the plurality of printing devices based on capability information indicating a capability of each printing device of the plurality of printing devices; and
in a case that the capability information indicating the capability of one of the plurality of printing devices changes, update the generated capability information,
wherein a print setting screen is generated based on the updated capability information.

2. The system according to claim 1, wherein the controller is further configured to transmit the generated capability information to the information processing apparatus.

3. The system according to claim 2, wherein, in the transmitting, the controller is configured to transmit the updated capability information to the information processing apparatus.

4. The system according to claim 2, wherein, in the transmitting, the controller is configured to transmit, to the information processing apparatus, information indicating that saving of the capability information is prohibited.

5. The system according to claim 1, wherein the controller is further configured to:
generate the print setting screen based on the updated capability information; and.
transmit the generated print setting screen to the information processing apparatus.

6. A method of controlling a system operable to save a print job received from an information processing apparatus and transmit the print job to one printing device among a plurality of printing devices that are registered in advance, in response to a request from the one printing device, the method comprising:
generating capability information for the plurality of printing devices based on capability information indicating a capability of each printing device of the plurality of printing devices; and
in a case that the capability information indicating the capability of one of the plurality of printing devices changes, updating the generated capability information,
wherein a print setting screen to be displayed on the information processing apparatus is generated based on the updated capability information.

7. The method according to claim 6, further comprising: transmitting the generated capability information to the information processing apparatus.

8. The method according to claim 7, wherein, in the transmitting, the updated capability information is transmitted to the information processing apparatus.

9. The method according to claim 7, wherein, in the transmitting, information indicating prohibition from saving the capability information is transmitted to the information processing apparatus.

10. The method according to claim 6, further comprising:
generating a print setting screen based on the updated capability information; and
transmitting the generated print setting screen to the information processing apparatus.

* * * * *